US008628672B1

(12) United States Patent
Si et al.

(10) Patent No.: US 8,628,672 B1
(45) Date of Patent: Jan. 14, 2014

(54) PROCESS FOR MANUFACTURING A PERPENDICULAR MAGNETIC RECORDING WRITER POLE WITH NONMAGNETIC BEVEL

(75) Inventors: Weimin Si, San Ramon, CA (US); Ying Hong, Los Gatos, CA (US); Zhigang Bai, Milpitas, CA (US); Yunhe Huang, Pleasanton, CA (US); Fenglin Liu, Milpitas, CA (US); Hong Zhang, Fremont, CA (US); Jikou Zhou, Pleasanton, CA (US); Xiaoyu Yang, Union City, CA (US); Yuan Yao, Fremont, CA (US); Iulica Zana, Fremont, CA (US); Feng Liu, San Ramon, CA (US); Ling Wang, Hercules, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/535,091

(22) Filed: Jun. 27, 2012

(51) Int. Cl.
*B44C 1/22* (2006.01)

(52) U.S. Cl.
USPC .................... 216/22; 216/66; 216/67; 216/75

(58) Field of Classification Search
USPC ......................................... 216/22, 66, 67, 75
See application file for complete search history.

(56) References Cited

U.S. PATENT DOCUMENTS

| | | | |
|---|---|---|---|
| 6,456,465 B1 | 9/2002 | Louis et al. | |
| 6,724,572 B1 | 4/2004 | Stoev et al. | |
| 6,791,793 B1 | 9/2004 | Chen et al. | |
| 6,906,894 B2 | 6/2005 | Chen et al. | |
| 7,070,698 B2 | 7/2006 | Le | |
| 7,199,973 B2 | 4/2007 | Lille | |
| 7,212,379 B2 | 5/2007 | Hsu et al. | |
| 7,212,380 B2 | 5/2007 | Hsiao et al. | |
| 7,271,982 B2 | 9/2007 | MacDonald et al. | |
| 7,296,337 B2 | 11/2007 | McFadyen | |
| 7,343,667 B2 | 3/2008 | Lille | |
| 7,377,024 B2 | 5/2008 | Chen | |
| 7,417,824 B2 | 8/2008 | Kameda | |
| 7,440,230 B2 | 10/2008 | Hsu et al. | |
| 7,446,980 B2 | 11/2008 | Le | |
| 7,468,862 B2 | 12/2008 | Sasaki et al. | |
| 7,506,431 B2 | 3/2009 | Hsiao et al. | |
| 7,522,379 B1 | 4/2009 | Krounbi et al. | |
| 7,532,432 B2 | 5/2009 | Ikeda et al. | |
| 7,558,019 B2 | 7/2009 | Le et al. | |
| 7,562,437 B2 | 7/2009 | Pentek et al. | |
| 7,576,951 B2 | 8/2009 | Allen et al. | |
| 7,633,713 B2 | 12/2009 | Chen et al. | |
| 7,712,206 B2 | 5/2010 | Jiang et al. | |
| 7,748,104 B2 | 7/2010 | Bonhote et al. | |
| 7,757,380 B2 | 7/2010 | Baer et al. | |

(Continued)

*Primary Examiner* — Binh X Tran

(57) ABSTRACT

A method for fabricating a magnetic recording transducer having a magnetic writer pole with a short effective throat height is provided. In an embodiment, a writer structure comprising a magnetic writer pole having a trailing bevel and a nonmagnetic stack on the top surface of the writer pole is provided. A dielectric write gap layer comprising alumina is deposited over the trailing bevel section and the nonmagnetic stack; and at least one etch stop layer is deposited over the dielectric write gap layer. A layer of nonmagnetic fill material is deposited over the etch stop layer and to form a nonmagnetic bevel by performing a dry etch process. The etch stop layer(s) are removed from the short throat section; and a trailing shield is deposited over the short throat section, nonmagnetic bevel, and nonmagnetic stack top surface.

19 Claims, 7 Drawing Sheets

(56) References Cited

U.S. PATENT DOCUMENTS

| | | |
|---|---|---|
| 7,768,743 B2 | 8/2010 | Guthrie et al. |
| 7,770,281 B2 | 8/2010 | Pentek |
| 7,777,988 B2 | 8/2010 | Guan et al. |
| 7,788,797 B2 | 9/2010 | Kim et al. |
| 7,793,406 B2 | 9/2010 | Zheng |
| 7,804,666 B2 | 9/2010 | Guan et al. |
| 8,248,728 B2 | 8/2012 | Yamaguchi et al. |
| 8,264,792 B2 * | 9/2012 | Bai et al. ............ 360/125.15 |
| 8,375,564 B1 * | 2/2013 | Luo et al. ............ 29/603.16 |
| 8,444,866 B1 * | 5/2013 | Guan et al. ............ 216/22 |
| 2006/0268456 A1 | 11/2006 | Sasaki et al. |
| 2007/0230046 A1 | 10/2007 | Le et al. |
| 2007/0236831 A1 | 10/2007 | Che et al. |
| 2008/0002292 A1 | 1/2008 | Le et al. |
| 2008/0112082 A1 | 5/2008 | Guan et al. |
| 2008/0198507 A1 | 8/2008 | Maruyama et al. |
| 2008/0225441 A1 | 9/2008 | Yamada et al. |
| 2008/0259498 A1 | 10/2008 | Lengsfield et al. |
| 2008/0278861 A1 | 11/2008 | Jiang et al. |
| 2009/0021863 A1 | 1/2009 | Zheng |
| 2009/0103211 A1 | 4/2009 | Chen et al. |
| 2009/0116145 A1 | 5/2009 | Guan et al. |
| 2009/0147410 A1 | 6/2009 | Jiang et al. |
| 2009/0154012 A1 | 6/2009 | Mochizuki et al. |
| 2009/0154019 A1 | 6/2009 | Hsiao et al. |
| 2009/0268344 A1 | 10/2009 | Guan et al. |
| 2010/0061016 A1 | 3/2010 | Han et al. |
| 2010/0165517 A1 * | 7/2010 | Araki et al. ............ 360/319 |
| 2010/0172054 A1 * | 7/2010 | Yamaguchi et al. ..... 360/125.03 |
| 2010/0277832 A1 | 11/2010 | Bai et al. |
| 2011/0134569 A1 | 6/2011 | Allen et al. |
| 2011/0151279 A1 | 6/2011 | Allen et al. |
| 2012/0087042 A1 * | 4/2012 | Zhou et al. ............ 360/235.4 |
| 2012/0314324 A1 * | 12/2012 | Guan ............ 360/123.12 |

* cited by examiner

PROCESS FOR MANUFACTURING A PERPENDICULAR MAGNETIC RECORDING WRITER POLE WITH NONMAGNETIC BEVEL

BACKGROUND OF THE INVENTION

Disk drives typically use heads residing on sliders to read from and write to the magnetic media. Read and write transducers residing in the head are flown at a small, controlled spacing above the magnetic medium (disk) during read and write operations. An air bearing forms between the head and the disk due to the disk rotating at high speeds to provide controlled head to disk spacing. Magnetic fields emanating from the write transducer pole tip switches magnetization of the magnetic medium, i.e., writing to the medium. Among other factors, a smaller and more tightly controlled magnetic writing field will allow more data to be written in the same space, thereby increasing areal density.

FIG. 1 illustrates a disk drive 10 used for data storage. Figures are not drawn to scale and only certain structures are depicted for clarity. Disk media 50 is attached to spindle motor and hub 20. The spindle motor and hub 20 rotate the media 50 in a direction shown by arrow 55. Head Stack assembly (HSA) 60 includes a magnetic recording head 30 on actuator arm 70 and positions actuator arm 70 by positioning the voice coil motor (VCM) 25 over a desired data track, shown as recording track 40 in this example, to write data onto the media 50.

FIG. 1a illustrates an enlarged view of a section of FIG. 1 including head 30 and track 40. A magnetic recording transducer 90 is fabricated on slider 80. Slider 80 may be attached to suspension 75 and suspension 75 may be attached to actuator arm 70 as shown in FIG. 2. A read transducer 93 is also fabricated on slider 80.

Referring again to FIG. 1a, Slider 80 is illustrated above recording track 40. Media 50 and track 40 are moving under slider 80 in an in-track direction shown by arrow 42. The cross-track direction is shown by arrow 41.

The magnetic recording transducer 90 has a leading edge 91 and a trailing edge 92. In this embodiment, the trailing edge 92 of recording transducer 90 is the final portion of magnetic transducer 90 that writes onto the recording track 40 as the media moves under the slider 80 in direction 42.

FIG. 2 illustrates a side view of the disk drive 10 shown in FIG. 1. At least one disk media 50 is mounted onto spindle motor and hub 20. HSA 60 comprises at least one actuator arm 70 that carries suspension 75 and slider 80. Slider 80 has an air bearing surface (ABS) facing media 50. When the media is rotating and actuator arm 70 is positioned over the media 50, slider 80 floats above media 50 by aerodynamic pressure created between the slider ABS and the surface of media 50 facing the ABS of slider 80.

DETAILED DESCRIPTION OF THE INVENTION

Figures 1, 1A:
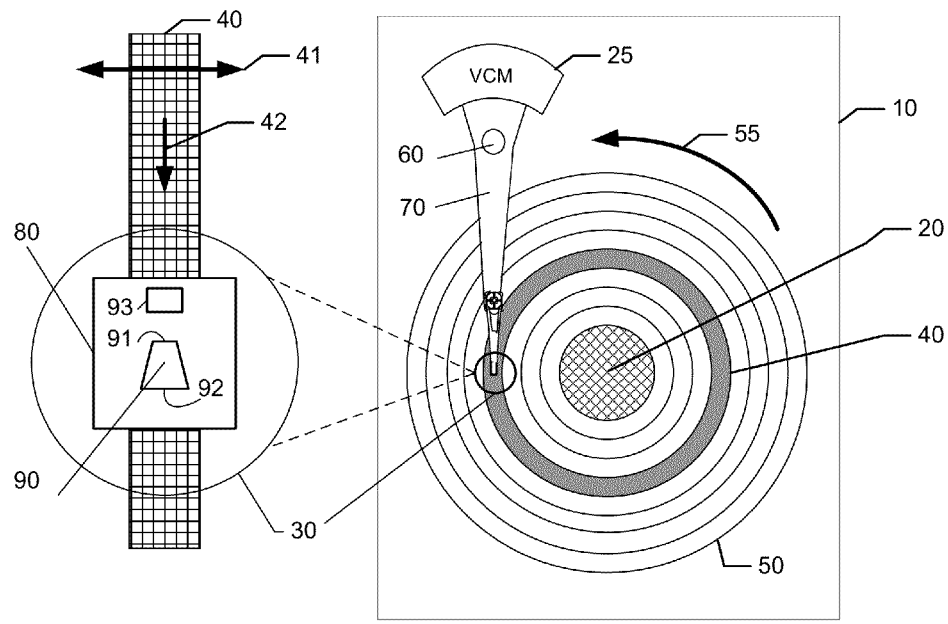
FIGS. 1 and 1a illustrate a top view of a hard disk drive.
Figure 2:
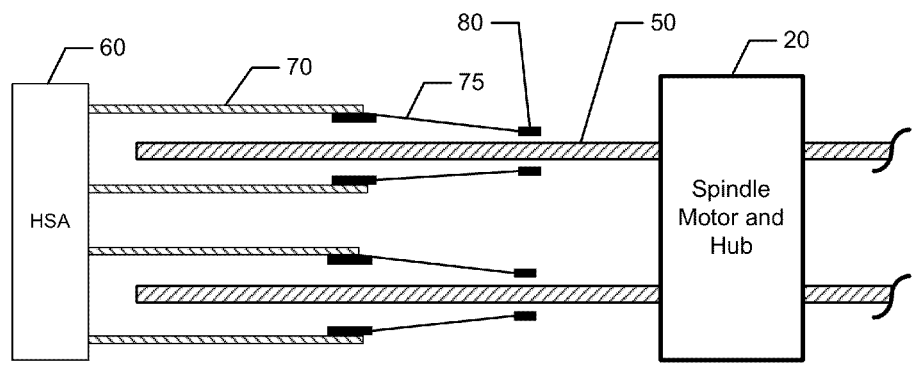
FIG. 2 illustrates a side view of a hard disk drive
Figure 3:
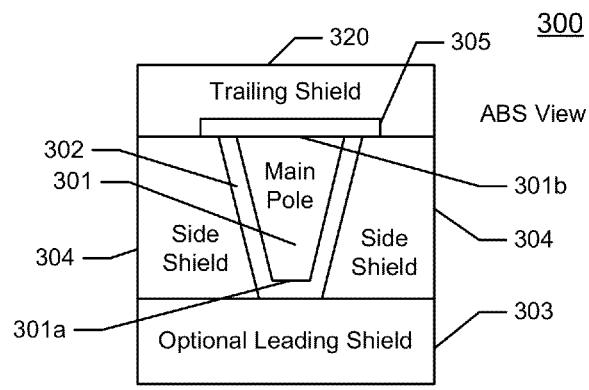
FIG. 3 illustrates an ABS view of a section of a perpendicular magnetic head in accordance with one aspect of the subject invention.

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention. References to top, side, bottom, or similar terms are used for descriptive purposes with reference to the figures and descriptions and should not be taken as limiting the scope of the invention FIG. 3 illustrates an ABS view of a writer section 300 of a magnetic recording transducer. The ABS view is the view looking at the ABS from the viewpoint of the media surface. Main pole 301 is separated from surrounding structures by nonmagnetic gaps 302 and 305. Main pole 301 has leading edge 301a on the leading side of main pole 301 and a trailing edge 301b on the trailing side of main pole 301. A trailing shield 320 is on the trailing side of main pole 301 and an optional leading shield 303 is on the leading side of main pole 301. Writer section 300 also has side shields 304 on the sides of main pole 301.

The main pole 301 is illustrated with a trapezoidal shape used in perpendicular magnetic recording (PMR); however, other shapes may also be used. Pole shapes may be, for example, rectangular or triangular. Pole edges illustrated with straight lines may also be implemented as curved or faceted. Those of skill in the art will recognize that these shapes, combinations or variations of these shapes, and other shapes may be used without departing from the spirit of the invention.

Figure 4:
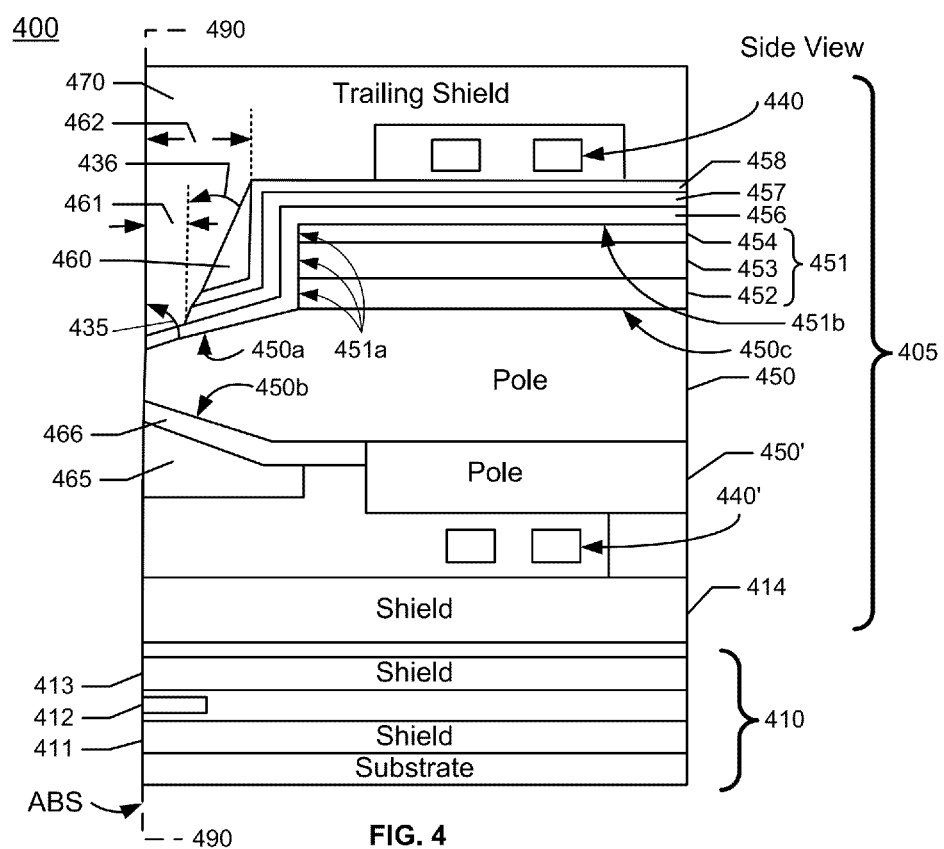
FIG. 4 illustrates a section of a side view of a perpendicular magnetic head in accordance with one aspect of the subject invention.

FIG. 4 illustrates an embodiment of the invention in a side section view of read/write head 400, incorporating a write transducer 405 and read sensor 410. For clarity, figures are not to scale. FIG. 3 depicts an ABS view of a writer section 300 only, while FIG. 4 depicts a side section view of read/write head 400 with ABS 490, including read sensor 410 and write transducer 405. The read sensor 410 may include shields 411 and 413 as well as sensor 412. Write transducer 405 shown in FIG. 4 includes shield 414, main pole 450, assist pole 450', coils 440 and 440', and trailing shield 470. Main pole 450 has trailing bevel 450a. Trailing bevel 450a is at a first angle 435 from the plane of ABS 490. Write transducer 405 may also include underlayer or optional leading shield 465 and interlayer 466.

Main pole 450 has a top surface 450c and spacer 451 above top surface 450c. Spacer 451 provides magnetic spacing between main pole 450 and trailing shield 470.

In one embodiment of the invention, spacer 451 may comprise a plurality of layers to provide nonmagnetic spacing, and may include etch stop layers, adhesion layers, or other layers useful for the manufacturing process.

In one aspect of the invention, spacer 451 comprises first spacer layer 452 above top surface 450c, second spacer layer 453 above first spacer layer 452 and third spacer layer 454 above second spacer layer 453. First spacer layer 452 may be used as an etching end point trace, and may comprise tantalum (Ta); and may serve as an adhesion layer and/or endpoint detection layer. Second spacer layer 453 may comprise ruthenium (Ru). Ru can be selectively etched and adheres well to Ta. Third spacer layer 454 may comprise Al$_2$O$_3$ (alumina) which is readily patterned and may be used as an underlayer for additional processes. Additional and/or other spacer materials may be used according to the process requirements.

Spacer 451 may be patterned as part of the process to fabricate trailing bevel 450a. During this process, first spacer layer 452, second spacer 453, and third spacer layer 454 will be patterned, thereby forming a substantially vertical side surface 451a at the point where trailing bevel 450a joins at top surface 450c of main pole 450.

Write gap 456 overlays trailing bevel 450a, side surface 451a, and above the top surface 451b of spacer 451. In one aspect of the invention write gap 456 comprises alumina; and in a further aspect write gap 456 may be deposited by atomic layer deposition (ALD).

In one embodiment of the invention, additional layers may be deposited over write gap 456. In one aspect of the invention, an etch stop layer 457 may be used as an ion beam etch (IBE) or reactive ion etch (RIE) etch stop layer. In another aspect of the invention, etch tracer layer 458 may be used above etch stop layer 457. In some aspects of the invention, etch stop layer 457 and/or etch tracer layer 458 may not be necessary.

Nonmagnetic bevel 460 begins at a first throat height 462 from ABS 490, and ends at a second throat height 461 from ABS 490. The nonmagnetic bevel 460 is provided at a second angle 436 measured from the plane of ABS 490. The effect of the nonmagnetic bevel 460 is to provide a reduced effective throat height shortened from first throat height 462 to second throat height 461 by providing nonmagnetic fill material in place of the magnetic shield material of trailing shield 470. The nonmagnetic bevel 460 effectively increases the write gap at the back of trailing bevel 450a; and thus minimizes magnetic flux leakage to trailing shield 470 and improves the magnetic write field at the ABS plane of main pole 450.

Other and/or different components may be fabricated in other embodiments. For example, optional leading shield 303 as shown in FIG. 3; and shown as optional leading shield 465 in FIG. 4 may be included. In addition, main pole 450 is shown including optional leading edge bevel 450b. However, in some embodiments, the optional leading edge bevel 450b may be omitted.

Figure 5:
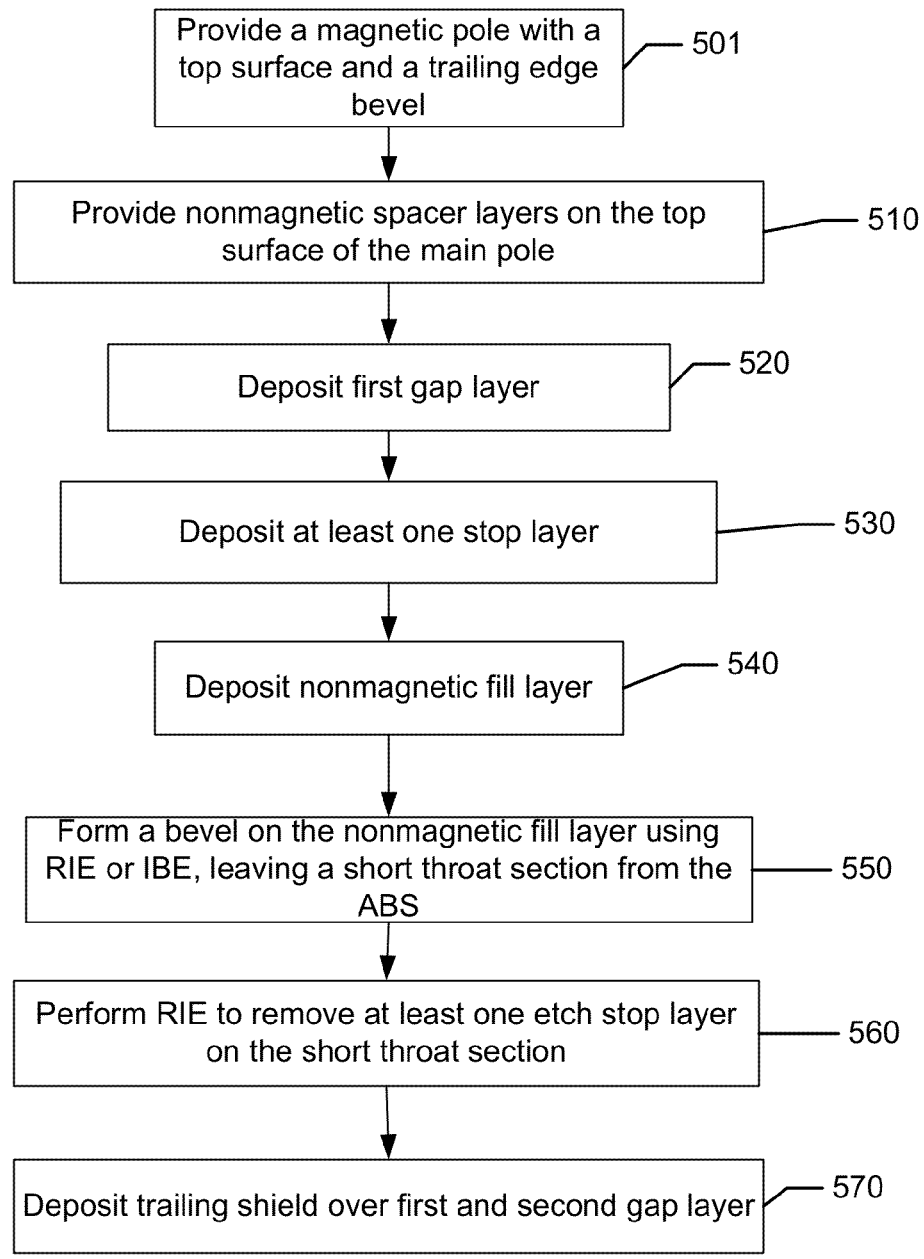
FIG. 5 illustrates a process for providing a perpendicular magnetic head in accordance with several aspects of the subject invention.

FIG. 5 illustrates a process 500 for providing a perpendicular magnetic head in accordance with several aspects of the subject invention. Starting in block 501, a magnetic pole having a top surface and trailing bevel are provided. A process for providing a magnetic pole bevel will be described in the foregoing paragraphs; however, the magnetic pole and trailing bevel may be fabricated using any suitable process.

Continuing in block 510, nonmagnetic spacer layers are provided on the top surface of the magnetic pole, leaving at least a portion of the trailing bevel without spacer layers. In one aspect of the invention, the nonmagnetic spacer layers substantially overlay the top surface of the magnetic pole, and the nonmagnetic spacer layers are substantially absent from above the trailing bevel of the magnetic pole. In another aspect of the invention, the spacer layers partially overlay a portion of the trailing bevel of the magnetic pole, and are absent from a section of the trailing bevel of the magnetic pole closest to the ABS. The nonmagnetic spacer layers will therefore have a side wall, the side wall having a thickness on the ABS side of the nonmagnetic spacer layers.

In block 520, a first gap layer is provided over the trailing edge bevel, the side wall of the nonmagnetic spacer, and the top surface of the nonmagnetic spacer. The first gap layer may be nonmagnetic and may serve as a write gap layer between the magnetic pole and a trailing shield. In one aspect of the invention the first gap layer comprises alumina; and in a further aspect the first gap layer may be deposited by ALD. The use of alumina for this layer offers significant advantages over a metal gap layer (e.g., Ru, Ta, Cr/Ru); and can be deposited in a very thin layer with ALD; and provides excellent Reactive Ion Etch (RIE) selectivity with respect to RIE etch stop layer(s).

In block 530 a least one etch stop layer is deposited. The etch stop layer may be deposited by physical vapor deposition (PVD) and may be an Ion Beam Etch (IBE) or RIE etch stop layer. The etch stop layer may be carbon or Ru. In one aspect of the invention, carbon is used for IBE, and in another aspect, a thin layer (<10 nm) of Ru is used for RIE. When carbon is used for IBE, a tracer layer may be deposited over the etch stop layer, and the tracer layer may be, for example, Ta or Ru.

In block 540, a thick (50-150 nm) layer of alumina is deposited. In one aspect of the invention, the alumina is deposited by ALD. This process will provide a conformal coating over the trailing bevel area, the nonmagnetic spacer side wall area, and the nonmagnetic spacer top surface.

In block 550, an IBE or RIE process may be used to etch the alumina deposited in block 540 to form a nonmagnetic bevel between the nonmagnetic spacer side wall and the trailing bevel. In the case of IBE, a multi-angle etch process may be used; and may also include for example, any of static milling, sweep milling, or rotation milling. In the case of RIE process, the process may use chlorine and/or fluorine based chemistry, and etching may be stopped when an endpoint is triggered; and a small amount of over-etch may be included. For example, BCl3+Cl2+CF4 chemistry may be used, and then stopped when an endpoint is triggered. These processes can provide a nonmagnetic bevel angle (illustrated as second angle 436 in FIG. 4) from about 50 to 85 degrees, and a second throat height 461 (shown in FIG. 4) of between 60-200 nm. The portion of the magnetic pole from the ABS to the beginning of the nonmagnetic bevel is referred to as the short throat section. The high RIE selectivity between the etch stop layer and the alumina; and also between the etch stop layer and the first gap layer allows precise control of the bevel angle etching, while preserving the highly conformal alumina write gap thickness (i.e., the short throat first gap layer thickness).

In block 560, the etch stop layer(s) are removed from the short throat section using RIE. In the case described in block 550 where IBE process was used, an oxygen RIE may be used to substantially remove the carbon etch stop layer from the short throat section; and in the case described in block 550 where RIE process was used, an oxygen/chlorine (e.g., O$_2$+Cl$_2$) RIE may be used to substantially remove the Ru etch stop layer from the short throat section.

In block 570, a trailing shield is deposited. The trailing shield may be deposited by first depositing a seed using PVD, and subsequently plating a thick shield over the seed.

Figure 6:
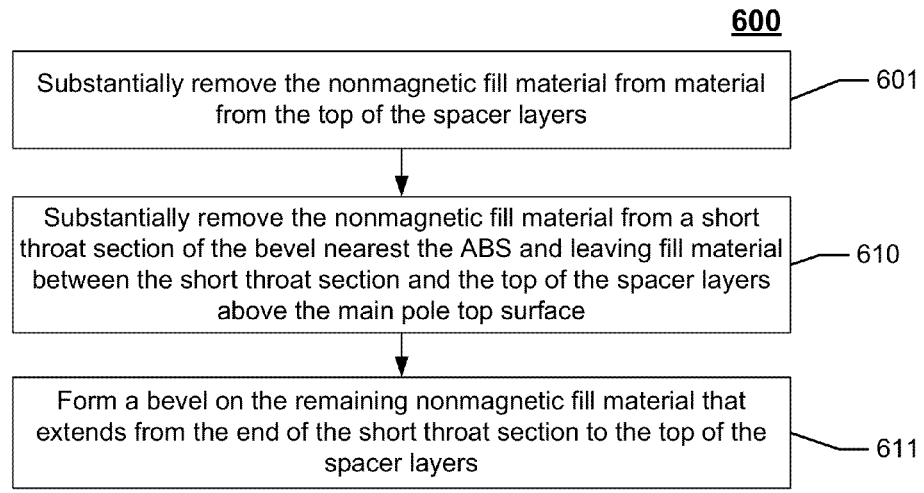
FIG. 6 illustrates a sub process for providing a nonmagnetic fill portion of a perpendicular magnetic head in accordance with one aspect of the subject invention.

FIG. 6 illustrates one aspect of the invention to implement a sub process 600 for providing a nonmagnetic bevel portion of a perpendicular magnetic head as described in FIG. 5, block 550. Process 600 includes blocks 601, 610, and 611 that may be performed in the order shown, in any order, or as iterations of the processes shown. The approach may be implemented by IBE or RIE, and may utilize multiple fixtures, multiple angles, and different operating modes such as rotation, sweeping, or static milling. The nonmagnetic fill material to be removed may be removed in separate steps; for example, in block 601 the nonmagnetic fill material may be substantially removed from the top of the nonmagnetic spacer layer. This may be accomplished with an RIE, or by IBE. In block 610 the nonmagnetic fill material is substantially removed from the short throat section nearest the ABS. This may be performed by changing milling angles and modes, for example, a sweeping mode. In block 611, the nonmagnetic fill material is removed in a manner to form a bevel. This may be by performing a unidirectional RIE, or by angle milling with IBE, depending on the process used. For RIE, etching may be stopped after a etch stop layer is detected. For IBE, the milling may be stopped after a tracer layer is detected.

Figure 7:
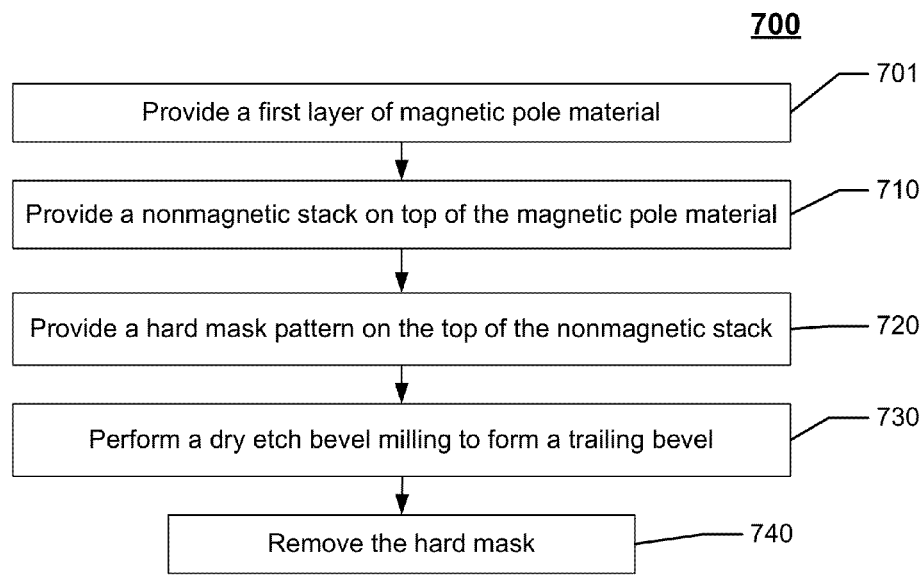
FIG. 7 illustrates a sub process for providing a beveled pole for a perpendicular magnetic head in accordance with one aspect of the subject invention.

FIG. 7 illustrates one aspect of the invention to implement a sub process 700 for providing a trailing bevel on a magnetic pole; and to provide nonmagnetic spacer layers to form a spacer stack for a perpendicular magnetic head as described in process 500, blocks 501 and 510. In this example, the spacer stack is provided before the magnetic pole bevel is formed; i.e., block 510 is performed before block 501. These steps may be reversed to accommodate different processes. In other embodiments, the spacer stack may be a single layer.

Beginning in block 701, a first layer of magnetic pole material is provided. Typical pole material comprises Co, Fe, and/or Ni alloys with high magnetic moment. Magnetic poles are typically formed using either an additive process such as a damascene method with a plated pole, or a subtractive process such as mill and lap. These processes are known to those of ordinary skill in the art. The pole may be fabricated using any suitable process and the present invention is applicable for any pole forming method.

Continuing in block 710, a nonmagnetic spacer stack is provided over the magnetic pole material. The nonmagnetic spacer stack may comprise a plurality of layers suitable for providing a nonmagnetic spacer compatible with the selected process. In one aspect of the invention, a nonmagnetic spacer stack suitable for use in a damascene process comprises a first layer of Ta, a second layer of Ru, and a third layer of alumina; and may be deposited using PVD process.

In block 720 a hard mask pattern is provided on the nonmagnetic spacer stack and the pattern is opened at the section of the magnetic pole to be beveled. The hard mask may comprise multiple layers. In one aspect of the invention, the hard mask may comprise a carbon layer, and a Ta layer above the carbon layer. A bottom anti-reflective layer (BARC) may also be used over the Ta layer to provide improved photo exposure. A resist is used to transfer a pattern to the Ta hard mask using, for example, an IBE process. The carbon hard mask layer can then be patterned using the Ta layer pattern above, for example using an oxygen RIE process.

In block 730, the trailing bevel of the magnetic pole is formed. In one aspect of the invention, an IBE is used to from the bevel section using a combination of vertical and angled etching. To form the desired angle of the bevel section, the etch angle may be selected such that the ion beam direction is partially blocked by the carbon mask to use its shadowing effect. Some of the factors to adjust the bevel angle include milling angle or wafer tilt angle, milling time, and hard mask height. By using these methods, bevel angles between approximately 20 to 45 degrees may be created.

In block 740, any remaining carbon hard mask is removed, for example by oxygen RIE.

Process 700 provides one method of forming a trailing bevel, although other methods may be used without departing from the spirit of the present invention.

FIGS. 8a-8g illustrates a process for providing a perpendicular magnetic head in accordance with several aspects of the subject invention.

Figure 8A:
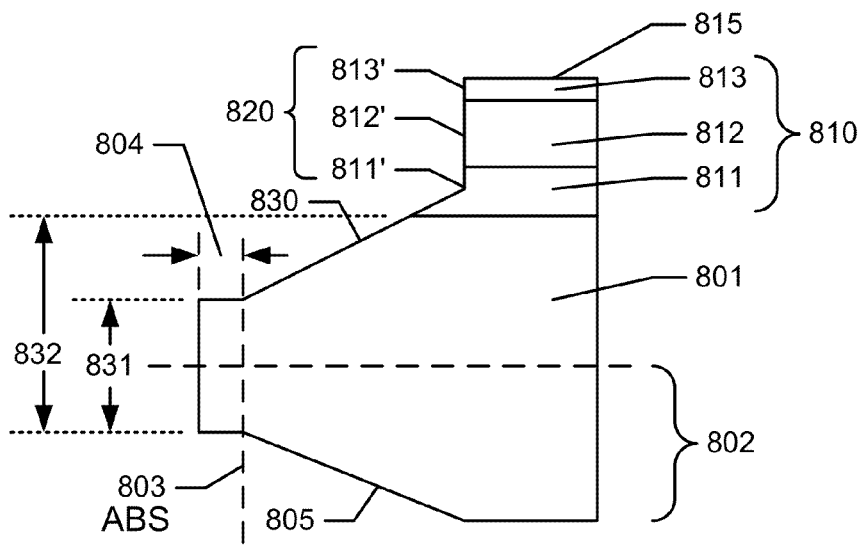
FIGS. 8a-8g illustrates a process for providing a perpendicular magnetic head in accordance with several aspects of the subject invention.

Beginning in FIG. 8a, a section of magnetic pole 801 having a first beveled surface 830 and nonmagnetic stack 810 is illustrated. The magnetic pole 801 and nonmagnetic stack 810 may be provided by the processes described in FIG. 5, FIG. 6 and FIG. 7 using process 500, process 600, and process 700 respectively; or by any other suitable means. FIG. 8a illustrates a bottom section 802 including optional leading bevel 805 of magnetic pole 801. The bottom section 802 is not illustrated in subsequent figures for clarity. Magnetic pole 801 has first beveled surface 830 with a first pole height 831 at the ABS 803, and a second pole height 832 at the top surface of magnetic pole 801. Also illustrated in FIG. 8a is pole tip section 804 which is an artifact of fabrication, and is typically lapped and milled down to ABS 803 in a later stage during slider fabrication. Due to lapping tolerances and other factors, the pole tip section 804 may be slightly over milled or under milled; and ABS 803 position may vary onto the pole tip section 804 or the first beveled surface 830 accordingly. On top of magnetic pole 801 resides nonmagnetic stack 810 that may comprise first spacer layer 811, second spacer layer 812, and third spacer layer 813. First spacer layer 811 has side wall 811' that may be partially beveled or substantially vertical. Second spacer layer 812 has side wall 812'. Third spacer layer 813 has side wall 813' and top surface 815. First side wall 811', second side wall 812', and third side wall 813' together form nonmagnetic stack side wall 820. In one aspect of the invention, first spacer layer 811 may comprise Ta; second spacer layer 812 may comprise Ru, alumina, or SiC; and third spacer layer 813 may comprise alumina.

Figure 8B:
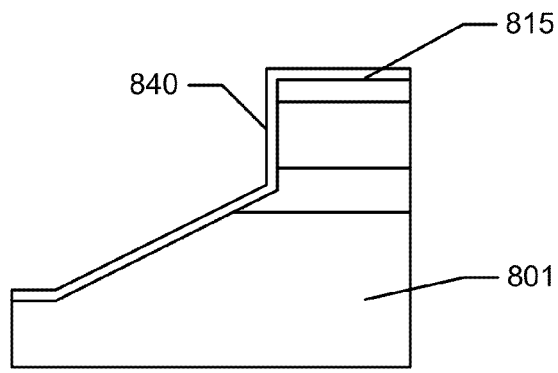

In FIG. 8b, a dielectric write gap layer 840 is deposited over magnetic pole 801, and nonmagnetic stack side wall 820 (illustrated in FIG. 8a) and over top surface 815 of third spacer layer 813. The dielectric write gap layer 840 may be alumina deposited by ALD, and functions as a write gap and trailing shield gap.

Figure 8C:
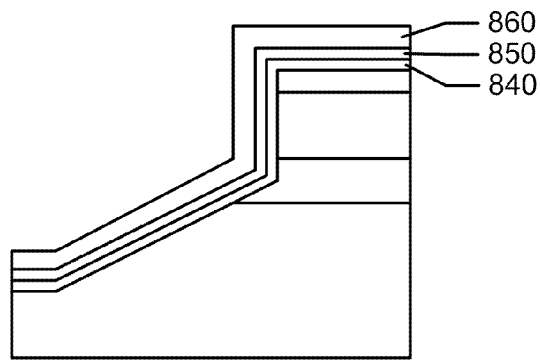

FIG. 8c illustrates etch stop layer 850 deposited on dielectric write gap layer 840. Etch stop layer 850 may be carbon if IBE process is to be used, and may be Ru if RIE process is to be used. Tracer layer 860 may be applied on etch stop layer 850 if IBE process is to be used and may comprise, for example Ta or Ru. If RIE process is to be used, the tracer layer 860 may be omitted.

Figure 8D:
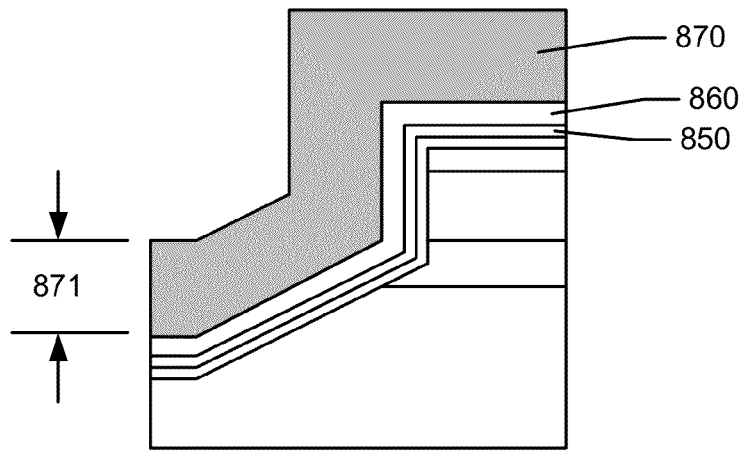

FIG. 8d illustrates nonmagnetic fill material 870 deposited over tracer layer 860, or optionally over etch stop layer 850 if tracer layer 860 is omitted. Nonmagnetic fill material 870 may comprise alumina and may have a thickness 871 of between approximately 50-150 nm.

Figure 8E:
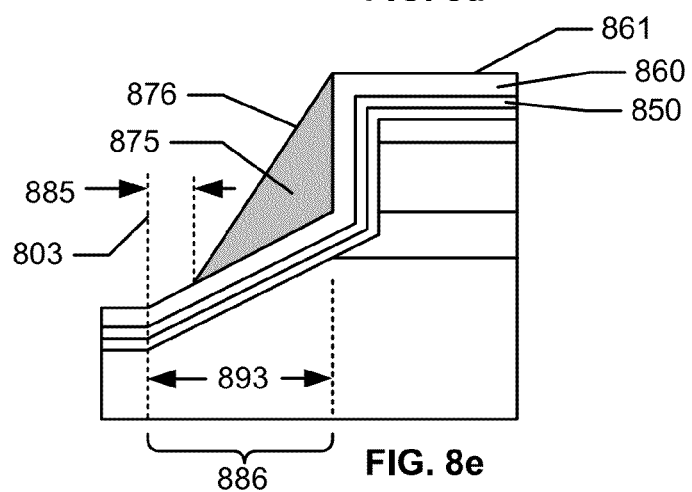

FIG. 8e illustrates the formation of second beveled surface 876 from nonmagnetic fill material 875 from second throat height 885 (measured from ABS 803) to the top surface 861 of third spacer layer 860; or optionally to the top surface of second spacer layer 850 if third spacer layer 860 is omitted. Second beveled surface 876 may be formed by IBE or RIE as previously described.

Figure 8F:
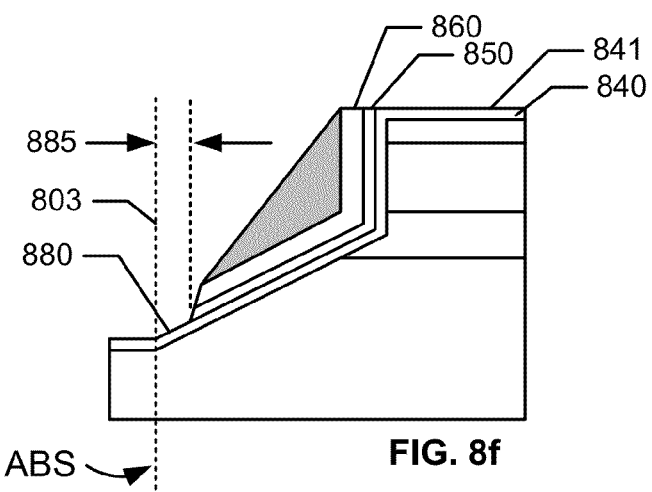

FIG. 8f illustrates the removal of the etch stop layer 850 and the tracer layer 860 from the short throat distance 885, and exposing write gap 840 at the short throat bevel 880 at least to the ABS 803. The tracer layer 860 (if used) and the etch stop layer 850 may be removed by RIE. At the same time, tracer layer 860 and etch stop layer 850 may be removed from the top surface 841 of dielectric write gap layer 840.

Figure 8G:
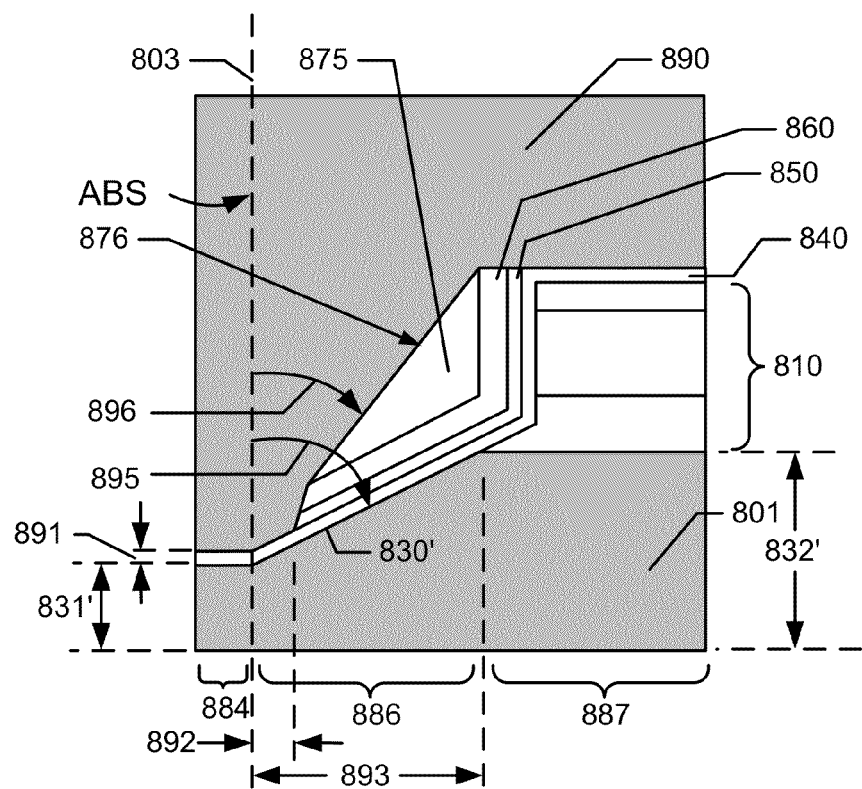

FIG. 8g illustrates magnetic pole 801 with the addition of trailing shield 890 over dielectric write gap layer 840 and also over sections of etch stop layers 850 and tracer layer 860, thereby forming a trailing shield 890 having a throat height shortened from first throat height 893 to second throat height 892; and having a narrow write gap 891 at ABS 803. Magnetic pole 801 includes pole tip section 884, trailing bevel section 886, and main pole section 887. Pole tip section 884 has first pole height 831'. Main pole section 887 has second pole height 832', and trailing bevel section 886 has a first beveled surface 830'. First beveled surface 830' is at first angle 895 from the plane of ABS 803. Nonmagnetic stack 810 is above main pole section 887 and dielectric write gap layer 840 is on the resulting structure of pole tip section 884, trailing bevel section 886, and nonmagnetic stack 810. Portions of etch stop layer 850 and tracer layer 860 remain on writer gap layer 840. Nonmagnetic bevel 875 overlays tracer layer 860, or etch stop layer 850 if tracer layer 860 is omitted. Nonmagnetic bevel 875 has second beveled surface 876 and second angle 896 from the plane of ABS 803. Trailing shield 890 overlays nonmagnetic bevel 875, thereby increasing the write gap spacing between the magnetic pole 801 and the trailing shield 890 beginning at second throat height 892 from ABS 803.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

We claim:

1. A method for fabricating a magnetic recording transducer, the method comprising:
   providing a magnetic writer pole and nonmagnetic stack comprising:
      a pole tip section adjacent an air bearing surface (ABS) plane with a first pole height;
      a main pole section located a first throat height from the ABS plane and having a second pole height greater than the first pole height,
      a trailing bevel section extending from the ABS plane to the main pole section, the trailing bevel section having a first beveled surface at a first angle to the ABS plane, and
      the nonmagnetic stack over the main pole section, wherein the nonmagnetic stack does not extend over at least a portion of the trailing bevel section near the ABS plane;
   depositing a dielectric write gap layer over the nonmagnetic stack and the magnetic writer pole;
   depositing an etch stop layer over the dielectric write gap layer;
   depositing a layer of nonmagnetic fill material over the etch stop layer;
   removing portions of the nonmagnetic fill material to form a nonmagnetic bevel over the trailing bevel section, the nonmagnetic bevel extending from a second throat height distal from the ABS plane to the first throat height, the nonmagnetic bevel having a second beveled surface at a second angle to the ABS plane, the second angle being less than the first angle;
   exposing a portion of the dielectric write gap layer by removing a portion of the etch stop layer between the ABS plane and the second throat height by reactive ion etching (RIE), and
   depositing a trailing shield over a resultant structure.

2. The method of claim 1 wherein forming the nonmagnetic bevel further comprises:
   substantially removing the nonmagnetic fill material disposed over the nonmagnetic stack; and
   substantially removing the nonmagnetic fill material disposed between the ABS plane and the second throat height to expose the portion of the etch stop layer.

3. The method of claim 1 wherein the etch stop layer is resistant to ion beam etching.

4. The method of claim 1 wherein the etch stop layer comprises carbon deposited on and in contact with the dielectric write gap layer.

5. The method of claim 1 wherein the nonmagnetic fill material comprises alumina.

6. The method of claim 1 further comprising depositing a tracer layer above the etch stop layer before depositing the nonmagnetic fill material.

7. The method of claim 6 wherein the tracer layer comprises tantalum or ruthenium.

8. The method of claim 1 wherein providing the magnetic writer pole comprises:
   providing a layer of magnetic pole material;
   providing the nonmagnetic stack on top of the magnetic pole material;
   providing a hard mask pattern on a top surface of the nonmagnetic stack;
   performing a dry etch bevel milling to form the trailing bevel section, and
   removing the hard mask.

9. The method of claim 8 wherein the dry etch bevel milling process comprises ion beam etching.

10. The method of claim 8 wherein the dry etch bevel milling process comprises reactive ion etching (RIE).

11. A method for fabricating a magnetic recording transducer, the method comprising:
    providing a magnetic writer pole and nonmagnetic stack comprising:
       a pole tip section adjacent an air bearing surface (ABS) plane with a first pole height;
       a main pole section located a first throat height from the ABS plane and having a second pole height greater than the first pole height;
       a trailing bevel section extending from the ABS plane to the main pole section, the trailing bevel section having a first beveled surface at a first angle to the ABS plane, and the nonmagnetic stack over the main pole section, wherein the nonmagnetic stack does not extend over at least a portion of the trailing bevel section near the ABS plane;

depositing a write gap layer comprising alumina over the nonmagnetic stack and the magnetic writer pole;

depositing an etch stop layer resistant to reactive ion etch (RIE) over the write gap layer;

depositing a layer of nonmagnetic fill material over the etch stop layer;

removing portions of the nonmagnetic fill material to form a nonmagnetic bevel over the trailing bevel section, the nonmagnetic bevel extending from a second throat height distal from the ABS plane to the first throat height, the nonmagnetic bevel having a second beveled surface at a second angle to the ABS plane, the second angle being less than the first angle;

exposing a portion of the write gap layer by removing a portion of the etch stop layer between the ABS plane and the second throat height by reactive ion etching (RIE), and depositing a trailing shield over a resultant structure.

12. The process of claim 11 wherein forming the nonmagnetic bevel further comprises:

substantially removing the nonmagnetic fill material from the nonmagnetic stack top surface;

substantially removing the nonmagnetic fill material from the magnetic writer pole between the ABS plane and the nonmagnetic bevel, there exposing the etch stop layer, and forming a nonmagnetic bevel section comprising nonmagnetic fill material extending from the first throat height to the top surface of the nonmagnetic stack.

13. The method of claim 11 wherein providing the magnetic writer pole comprises:

providing a first layer of magnetic pole material;

providing a nonmagnetic stack on top of the magnetic pole material;

providing a hard mask pattern on the top surface of the nonmagnetic stack;

performing a dry etch bevel milling to form a trailing bevel, and removing the hard mask.

14. The method of claim 11 wherein the etch stop layer comprises ruthenium.

15. A method for fabricating a magnetic recording transducer, the method comprising:

providing a magnetic writer pole and nonmagnetic stack comprising:

a pole tip section adjacent an air bearing surface (ABS) plane with a first pole height;

a main pole section located a first throat height from the ABS plane and having a second pole height greater than the first pole height;

a trailing bevel section extending from the ABS plane to the main pole section, the trailing bevel section having a first beveled surface at a first angle to the ABS plane, and the nonmagnetic stack over the main pole section, wherein the nonmagnetic stack does not extend over at least a portion of the trailing bevel section near the ABS plane;

depositing a write gap layer comprising alumina over the nonmagnetic stack and the magnetic writer pole;

depositing a etch stop layer over the write gap layer;

depositing a tracer layer on the etch stop layer;

depositing a layer of nonmagnetic fill material over the tracer layer;

removing portions of the nonmagnetic fill material to form a nonmagnetic bevel over the trailing bevel section, the nonmagnetic bevel extending from a second throat height distal from the ABS plane to the first throat height, the nonmagnetic bevel having a second beveled surface at a second angle to the ABS plane, the second angle being less than the first angle;

exposing a portion of the write gap layer by removing a portion of the etch stop layer and the tracer layer between the ABS plane and the second throat height by reactive ion etching (RIE), and depositing a trailing shield over a resultant structure.

16. The process of claim 15 wherein forming the nonmagnetic bevel further comprises:

substantially removing the nonmagnetic fill material from the nonmagnetic stack top surface;

substantially removing the nonmagnetic fill material from the magnetic writer pole between the ABS plane and the nonmagnetic bevel, there exposing the etch stop layer, and forming a nonmagnetic bevel section comprising nonmagnetic fill material extending from the first throat height to the top surface of the nonmagnetic stack.

17. The method of claim 15 wherein providing the magnetic writer pole comprises:

providing a first layer of magnetic pole material;

providing a nonmagnetic stack on top of the magnetic pole material;

providing a hard mask pattern on the top surface of the nonmagnetic stack;

performing a dry etch bevel milling to form a trailing bevel, and removing the hard mask.

18. The method of claim 15 wherein the etch stop layer comprises carbon.

19. The method of claim 15 wherein the tracer layer comprises ruthenium or tantalum.

* * * * *